Patented Oct. 18, 1938

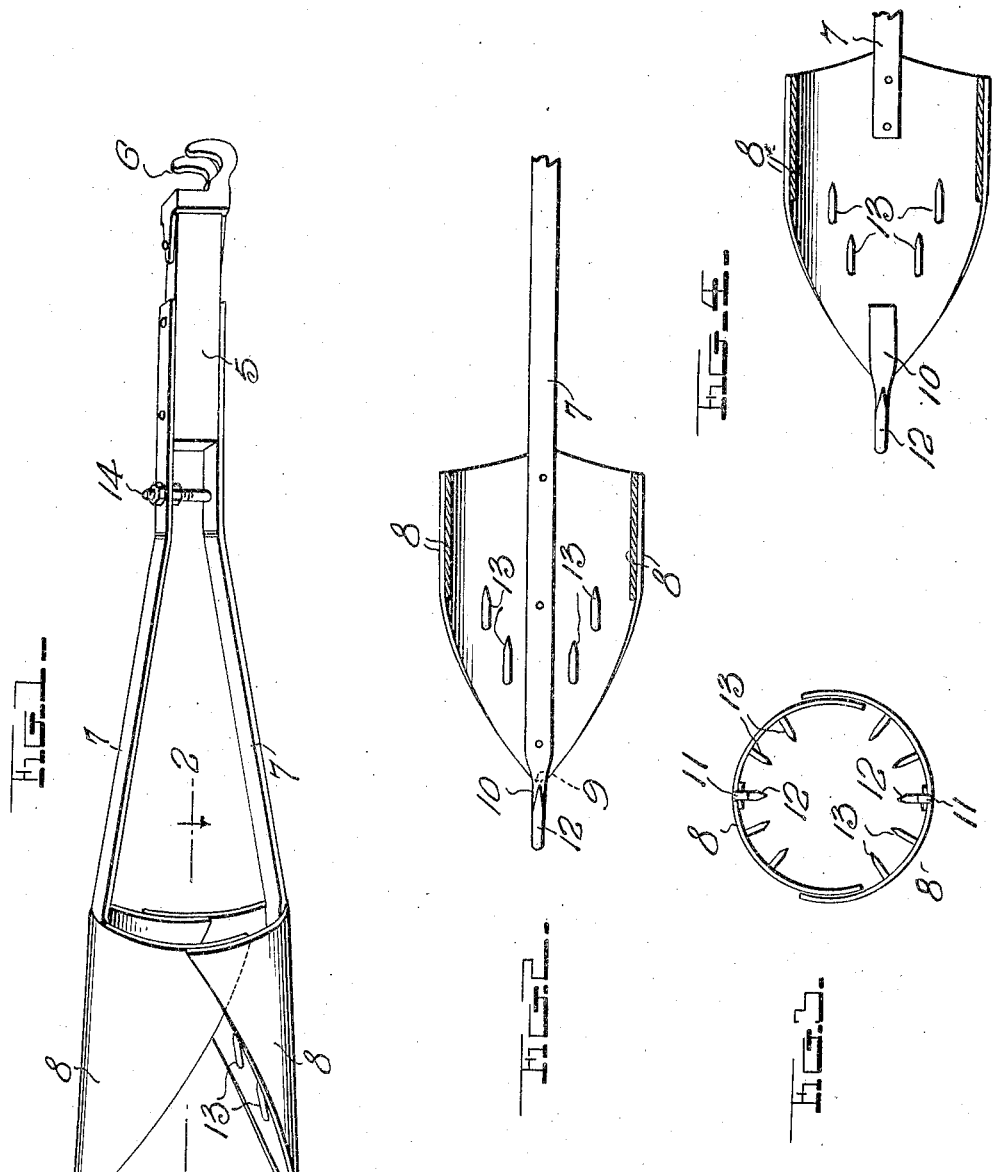

2,133,342

UNITED STATES PATENT OFFICE 2,133,342

EXPANSIBLE ROOT CUTTER

Elbert J. Brooks, Sparta, Wis.

Application September 2, 1936, Serial No. 99,175

4 Claims. (Cl. 15—104)

The invention aims to provide an exceptionally simple and inexpensive, yet an efficient tool for cutting roots which may be totally or partially clogging sewers. The feeder roots enter the sewers through cracks or defective joints and the fine, curled or fiber roots will soon totally close the sewers. By use of the present invention, however, the curled roots may be readily cut from the feeders and removed with any deposits which may have collected upon them. The tool disclosed in this application is adjustable to fit sewers of different sizes and by using four of the tools, sewers may be taken care of ranging from four to fifteen inches and the fifteen inch tool will also accomplish good results in larger sewers.

Figure 1 of the accompanying drawing illustrates a perspective view showing one form of construction.

Fig. 2 is a horizontal sectional view substantially on line 2—2 of Fig. 1.

Fig. 3 is a front end view.

Fig. 4 is a view similar to Fig. 2 but showing a slightly different form of construction.

In the drawing above briefly described, the numeral 5 designates a shank having any suitable coupling 6 at its rear end for connecting it with a sewer rod, which rod is actuated by means of the customary booster to force the tool through the roots in the sewer and to reciprocate the tool to rearwardly feed the cut roots. Spring arms 7 (preferably two) are secured to and project forwardly from the shank 5, and said arms carry knives 8 which slightly overlap each other and jointly form a cylindrical cutter, one of said knives 8 being allotted to each of said arms 7. The arms 7 may continue forwardly throughout the lengths of the knives 8 as seen in Figs. 1 and 2, or may be connected only with the rear portions of the knives as illustrated in Fig. 4, riveting and/or welding, or other suitable means being provided to secure the arms and knives together.

The knives 8 are each provided with a central sharply pointed front end 9 and all forwardly presented edges of said knives are sharpened for root-cutting purposes. To guide these edges over uneven sewer joints, I provide the knives 8 with forwardly projecting runners 10 having inwardly curved front ends 11, and these runners may either be formed by appropriately shaping the front ends of the arms 7 when the latter extend to the front ends of the knives 8 or may be formed as separate pieces and secured to the knives by riveting and/or welding or in some other suitable way. The runners 10 are provided at their inner sides with rearwardly directed root-feeding barbs 12 and the inner sides of the knives 8 are preferably provided with additional root-feeding barbs 13 welded or otherwise secured thereto.

The arms 7 are connected near their rear ends by an adjusting bolt 14 by means of which the spacing of said arms may be varied to adjust the tool for use in sewers of different sizes.

No matter how large a bunch of fine curled roots may be in a sewer, there are only a few small feeders leading in from the exterior. Cutters heretofore provided, some with central spears and others with slanting knives and wtih points of the knives one or two inches from the tile, tend to contact only with the obstruction of roots and push it forwardly rather than cleanly cutting the feeders and feeding the curled roots into the cutter. The present invention, however, is so designed that the points of the knives as well as the heels lie against the interior of the sewer and the knives slide readily between the sewer wall and the curled roots and readily cut the feeders. The curved runners on the points of the knives readily guide them over the uneven joints in the sewer tile and travel in contact with the tile, and for that reason the heels as well as the points of the knives fit the tile and enable the knives to readily slide between the tile and the roots. The acutely pointed front ends of the knives also assist materially in penetrating a mass of roots as easily as the spears on other types of cutters, and the runners 10, being relatively long and narrow, split accumulations of roots and make entrances for said pointed ends of the knives, so that the cutting edges of the latter can immediately act as soon as they encounter the roots. The improved cutter has a longer body than most cutters for holding the small chunks of roots and the heavy waxy mixtures—clay, grease and roots. Due to the expanding feature of the cutter, three sizes of the latter will operate perfectly in sewers ranging from six to fifteen inches in diameter and the fifteen inch cutter may also be successfully used in still larger sewers. When the cutter is being moved backward and forward a few inches, the various barbs on the insides of the knives, effectively feed the roots back into the cutter body and hold them securely while the cutter is being removed for unloading. It is not at all unusual for the tool to remove in one load, a mass of roots as large as the sewer and two feet or more in length, and moreover, the mass is always cut cleanly at the sewer wall instead of merely being torn loose and leaving a number of roots standing to cause further trouble.

By providing the barbs on the inner sides of the knives and by using the runners 10 on the points of said knives, the customary central barb shaft which has a tendency to force a mass of roots ahead in the sewer, may be eliminated. There is a distinct advantage in the fact that the knives are long and sharp and acutely pointed while other cutter knives are often short and straight or only slightly curved and may tend to push the mass of roots ahead in the sewer instead of cutting. The pointed knives of the present tool will penetrate any mass of coarse or fine curled roots. Because of the fact that the spring arms 7 are longer than those on customary cutters, the capacity of the present tool for holding roots as they are fed back into the cutter, is greater and the cutter need not be removed and reinserted as often as usual. The spring arms, preferably formed from spring steel, cause the knives to press constantly against the sewer tile while the curved runners on the points of the knives guide them over uneven joints, enabling the knives to thereby slide between the tile and the mass of roots to cut the feeders. The adjustable feature of the tool is also of obvious advantage in that a great number of sizes are not required to take care of sewers of the sizes commonly used.

From the foregoing taken in connection with the accompanying drawing, it will be seen that novel and advantageous provision has been made for carrying out the object of the invention, and while preferred details have been disclosed, it is to be understood that numerous variations may be made within the scope of the invention as claimed.

I claim:—

1. A tool for cutting roots and withdrawing them from sewers, comprising a shank, forwardly extending relatively movable arms carried by said shank, elongated transversely arcuate knives carried one by each of said arms and slidably overlapped to jointly form an expansible and contractible cutter having a cylindrical rear end, each of said knives having a pointed front end, runners connected with and projecting forwardly from said knives to guide them over uneven sewer joints, and rearwardly directed root-feeding barbs located internally of the tool and positioned to prevent forward sliding of the cut roots from the tool while withdrawing the latter from the sewer.

2. A tool for cutting roots and withdrawing them from sewers, comprising a shank, forwardly extending relatively movable arms carried by said shank, elongated transversely arcuate knives carried one by each of said arms and slidably overlapped to jointly form an expansible and contractible cutter having a cylindrical rear end, each of said knives having a pointed front end, and runners connected with and projecting forwardly from said knives to guide them over uneven sewer joints, said runners having rearwardly directed root-feeding barbs at their inner sides.

3. A tool for cutting roots and withdrawing them from sewers, comprising a shank, forwardly extending relatively movable arms carried by said shank, elongated transversely arcuate knives carried one by each of said arms and slidably overlapped to jointly form an expansible and contractible cutter having a cylindrical rear end, each of said knives having a pointed front end, runners connected with and projecting forwardly from said knives to guide them over uneven sewer joints, said runners having rearwardly directed root-feeding barbs at their inner sides, and additional rearwardly directed root-feeding barbs carried by said knives and disposed at the inner sides thereof.

4. An expansible and contractible tool for cutting roots and withdrawing them from sewers of different sizes, comprising a shank, a plurality of forwardly diverging resilient arms secured to said shank and projecting forwardly therefrom, elongated knives secured to said arms and jointly forming a substantially cylindrical cutter regardless of the size to which the tool be expanded or contracted, said knives having transversely arcuate slidably overlapped rear ends, each of said knives having a centrally pointed front end and longitudinal edges diverging rearwardly from the point, said longitudinal edges of adjacent knives converging rearwardly and crossing each other to provide the cutter with a circumferentially continuous zig-zag front end regardless of the extent to which the knives be overlapped by expanding or contracting the tool to fit different sizes of sewers, means for guiding said knives over uneven sewer joints, and means for preventing forward sliding of the cut roots from the cutter when withdrawing the tool.

ELBERT J. BROOKS.